United States Patent [19] [11] 3,872,260
Oatis [45] Mar. 18, 1975

[54] TOLL CALL PROHIBITOR

[75] Inventor: Melvin Neal Oatis, Tustin, Calif.
[73] Assignee: Telephonic Equipment Corporation, Santa Ana, Calif.

[22] Filed: Aug. 10, 1972
[21] Appl. No.: 279,713

[52] U.S. Cl. .......... 179/18 DA, 179/90 D
[51] Int. Cl. .......... H04m 1/66
[58] Field of Search .......... 179/90 D, 18 DA, 6.3 R

[56] References Cited

UNITED STATES PATENTS

| | | | |
|---|---|---|---|
| 3,553,382 | 1/1971 | Knox | 179/18 DA |
| 3,569,634 | 3/1971 | Amadasi | 179/18 DA |
| 3,681,536 | 8/1972 | Pask | 179/18 DA |
| 3,727,007 | 4/1973 | Catlin | 179/18 DA |
| 3,749,847 | 7/1973 | Piacente | 179/90 D |
| 3,757,055 | 9/1973 | McCann | 179/90 D |

*Primary Examiner*—Kathleen H. Claffy
*Assistant Examiner*—C. T. Bartz

[57] ABSTRACT

A toll call prohibitor for use with a telephone system wherein directly dialed toll calls can be made from a telephone instrument. The toll call prohibitor of this invention is connected to a telephone instrument which can ordinarily be utilized for making a toll type of call and serves to limit such calls if they are not authorized. Such unauthorized calls are prevented from being made by causing the telephone instrument to be disconnected from the central office when a call to an unauthorized number or series of numbers is attempted and sensed by this invention.

The toll prohibitor of this invention can be connected to a telephone line by a telephone interconnect and generally comprises a modular unit which can be connected to provide toll monitoring for a plurality of telephone instruments. The toll prohibitor incorporates a means for detecting the removal of the receiver from a telephone instrument, a power supply or voltage regulator, a series of counters which are programmed to count pulses derived from the make and break of the instrument dial and a means for determining the number of dial pulls in cooperation with a disallowed number detector for disallowing the use of the telephone upon recognition of unauthorized numbers by the modular unit. The modular unit also incorporates a means for inhibiting and resetting the entire system detection and counting circuit.

7 Claims, 5 Drawing Figures

TOLL CALL PROHIBITOR

BACKGROUND OF THE INVENTION

1. Field of the Invention

The field of this invention lies within the telephone art.

2. The Prior Art

The prior art for prohibiting toll calls has been directed toward various mechanical and electronic means for limiting unauthorized calls on a telephone instrument.

Specifically, the mechanical aspects of the prior art incorporates linkages, palls, cams, gears, and various other means to prohibit dial movement in a particular manner. The mechanical means for prohibiting unauthorized calls also incorporates certain mechanical means for opening a switch when certain pulls of a dial are effectuated. These particular mechanical means met with substantial problems insofar as the linkages and other mechanical members were not always capable of being maintained in good working order. Furthermore, the operative features of such devices are such that they are cumbersome, expensive and hard to utilize.

As a consequence of the foregoing, certain toll prohibiting apparatus has been developed in the prior art utilizing electronic means. The electronic means incorporates certain connect or disconnect means having counters, storage means, pulse generating circuits, and many complex electronic circuits.

Certain portions of the prior art incorporate decoders, digit selectors and complex devices for disconnecting a line. Some of the prior art is based upon counting pulses in a dialing system. As can be appreciated, if the pulses are not counted properly, the system will fail to prohibit an unauthorized call.

The foregoing circuits and electronic apparatus has inherent deficiencies by creating a situation wherein there is not a backup device for preventing unauthorized calls in the eventuality pulse outputs from the dial are not properly counted, or there are other failures in the system. As can be appreciated, if there is a failure to count the specific pulses and store them, the prohibitor will not operate properly.

In addition to the foregoing, the prior art also incorporates storage means for maintaining certain pulses or signals in a stored condition. The stored condition of the pulses is subject to deterioration by virtue of the fact that certain operating elements can deteriorate and thereby degrade the storage capability. Furthermore, the decoding means necessary for effectuating an output for the stored signals is substantially complicated and does not do anything to enhance the operation of a toll call prohibiting device.

On balance, the prior art does not provide the necessary electronic means for prohibiting unauthorized calls by reason of the fact that there are difficulties in storage of the signals, the decode means, the reset means, the counting means, the stabilizing circuits, and the logic circuits. As a consequence, this invention is a substantial step over the prior art.

This invention incorporates firstly a non-storage type of feature for limiting unauthorized toll calls. Specifically, the invention does not require any storage of pulses, signals, or any other particular output from a telephone instrument in order to prohibit a call from the instrument.

The invention hereof also overcomes the prior art by eliminating a memory and other specific drawbacks which must be incorporated into a system. The elimination of a memory and storage enhances the operation of this system and allows for a consistent prohibition of toll calls at a user's discretion.

In addition to the foregoing advantages, this invention incorporates a backup system which counts the number of dial pulls. Specifically, it takes approximately eight dial pulls to determine whether a call is a toll call or a local call. For instance, if one were to merely dial a toll call within a specific area, one would utilize the numeral 1 before the seven subsequent numbers. Therefore, eight dial pulls would indicate that a toll call was being attempted, and which would be subject to prohibition by this invention.

The invention can also be programmed in many ways to prevent specific numbers from being called, or prevent specific area codes from being called. Furthermore, the device can be readily programmed by hardwire programming to restrict calls in substantially any mode. In addition to the foregoing advantages, the device can also be utilized to restrict all calls which are originated from the telephone instrument. In such a case only incoming calls can be placed on the telephone instrument.

In addition to the foregoing advantages, the invention operates in a functional and efficient manner to provide the use of a telephone for all authorized calls without any delays. The invention immediately places the telephone in a ready state after an unauthorized call, so that the user might proceed to dial another number.

In essence, this invention is a step over the prior art by incorporating an easily used device for prohibiting unauthorized telephone calls from a telephone instrument.

SUMMARY OF THE INVENTION

In summation, this invention incorporates a module capable of being interfaced with a telephone instrument directly or through an interconnect system for purposes of prohibiting any unauthorized calls which have been programmed into the circuit of the module.

Specifically, the invention provides a modular unit which will prevent unauthorized calls from being placed on a trunk line through a telephone. The device enables one to connect the modular unit in a grouping to eliminate unauthorized calls from an entire series of telephones in an office. The invention can also be utilized to allow certain calls with respect to certain telephone instruments and disallow certain calls from other telephone instruments.

In essence, the modular portion of this invention comprises a means for detecting when a telephone receiver is off the hook to provide recognition of certain pulses or signals from the telephone instrument. An appropriate noise filter eliminates unwanted transient spikes and other voltages from the remainder of the circuit. The system incorporates a series of drivers, decade counters, and a binary demultiplexer with certain module inhibit means and includes a reset means for the entire circuit. In addition thereto, a means for providing proper voltages for the circuitry is provided. A digit disallowance feature is utilized to indicate the number of dial turns thereby disallowing a telephone call after a certain number of dial pulls have been sensed.

The entire module serves to operate an unauthorized number detector which will conveniently disconnect the telephone for a period long enough to prevent a call from going through; or it can be utilized to issue a signal to a user that an unauthorized call has been attempted.

BRIEF DESCRIPTION OF THE DRAWINGS

The invention will be more clearly understood by reference to the description taken in conjunction with the accompanying drawings, wherein.

DESCRIPTION OF THE PREFERRED EMBODIMENTS

General Apparatus Configuration

Figures 1, 2:
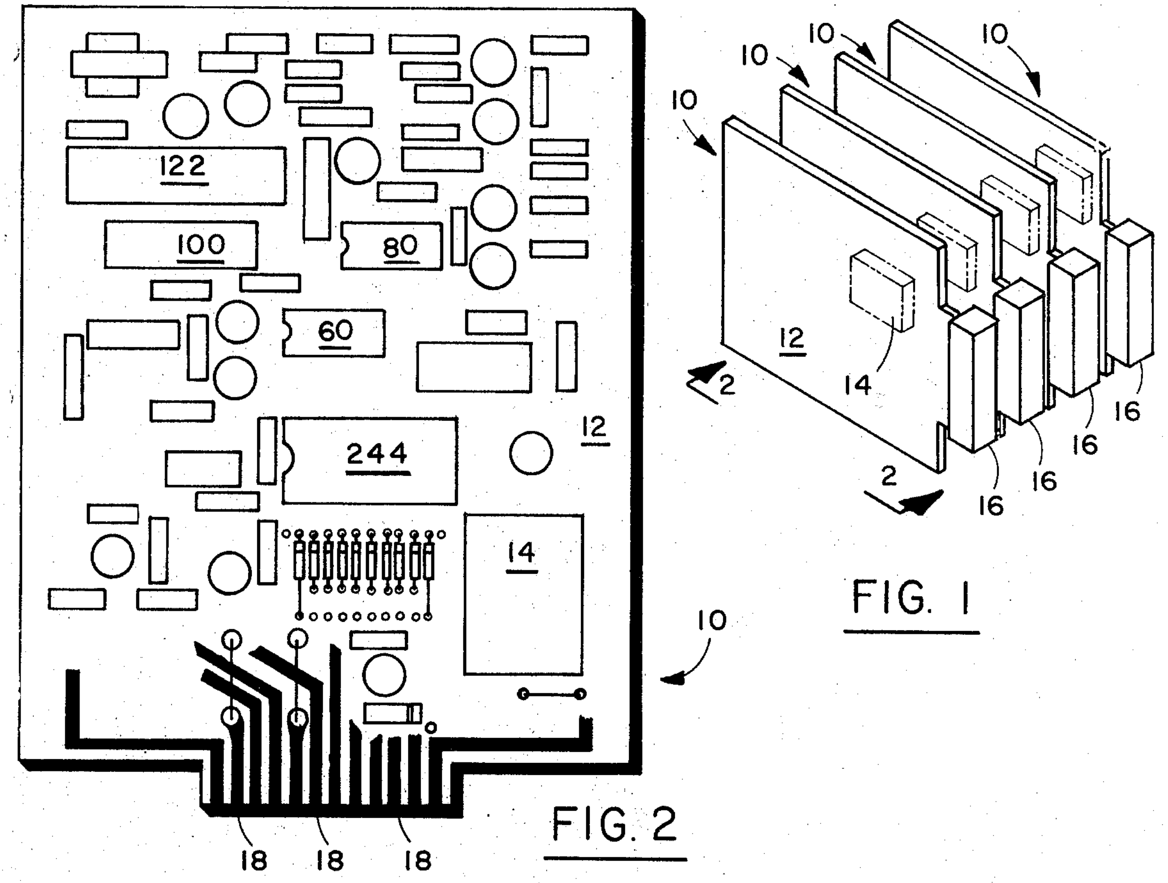
FIG. 1 shows a series of modular units incorporating the circuitry of this invention.
FIG. 2 shows a plan view of a modular unit incorporating components of this invention.

Looking at FIG. 1, modular units 10 are shown comprising in part a circuit board 12 having a relay 14 thereon. The modular units 10 are fitted into terminal blocks 16 which effectively couple the modular units 10 into the telephone system.

As can be seen in FIG. 2, the circuit board 12 is provided with a number of terminals 18 which interconnect the boards 12 to the terminal blocks 16. The units 10 can be thusly interconnected with a telephone instrument and the trunk line of a telephone system to prohibit unauthorized calls thereon.

Telephone Interconnect

Figure 3:
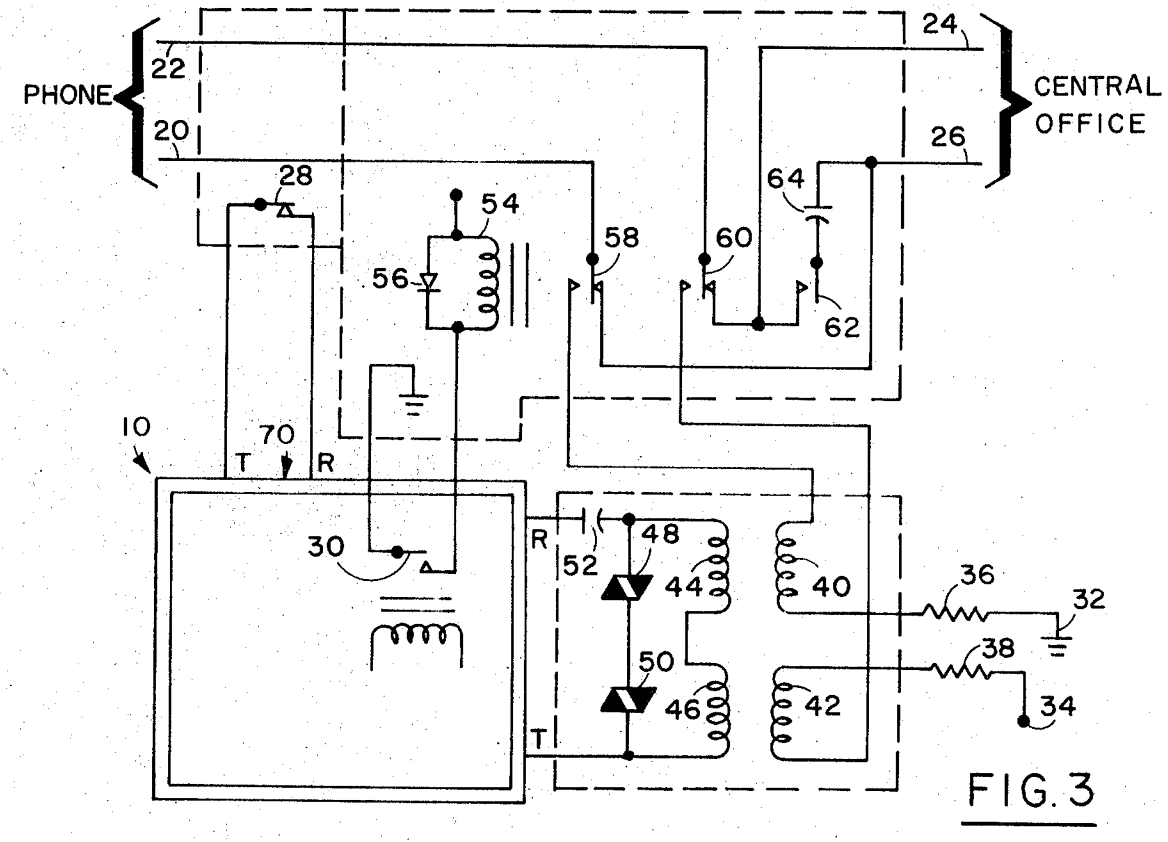
FIG. 3 shows a telephone interconnect system for this invention that can be utilized therewith.

Looking more specifically at FIG. 3, a telephone interconnect for the apparatus is shown. The interconnect can be any suitable means for providing dial pulses and pulls to the unit 10. Regardless of how the modular unit 10 receives the signals, it is incumbent that it receive them for the best operation of the invention. The reason for the interconnect is to avoid unwanted transients on the telephone trunk line.

The following description of an interconnect is merely one method of connecting the modular unit 10 to the telephone instrument. One side of the interconnect is utilized for connecting a telephone instrument by means of lines 20 and 22. On the other side of the interconnect, lines 24 and 26 serve to connect the system to the central office or trunk line.

A dial pulse repeater 28 is shown leading to a configuration generally enclosed which is tantamount to the modular unit 10. The dial pulse repeater 28 feeds signals into the toll prohibitor modular unit 10 to provide effective monitoring of unauthorized calls, as will be described. The toll prohibitor 10 has a relay 30 which will be further described in connection with the other portion of the system.

The calls coming into the toll prohibitor 10 from the telephone instrument incorporate dial pulses which are on lines tantamount to the tip and ring as are labeled with a T and R respectively. The interconnect also incorporates a control tip and ring connection with the modular unit 10 and is labeled T′ and R′ at the other points where it connects with the toll prohibitor. A 48 volt power supply 32 is shown which provides and incorporates a negative input 34. The power supply is delivered to the interconnect system through the foregoing terminals 32 and 34 and respective current limiting resistors 36 and 38. The current limiting resistors 36 and 38 feed to transformer coils 40 and 42 which are in proximate relationship to transformer coils 44 and 46. Coils 44 and 46 are spanned by peak voltage limiting diodes 48 and 50. An isolation capacitor 52 maintains the coils 40, 42, 46, and 48 in a manner so that only audio signals are seen across the coils.

The relay 30 functions by virtue of the modular unit 10 recognizing an unauthorized call. When this happens, a relay 54 is energized. A diode 56 is utilized across the relay 54 to eliminate any substantial EMF spikes which might serve to trigger its action. The relay 54 closes contacts 58, 60 and 62 for purposes of disconnecting the proposed telephone call which has been recognized as unauthorized, from the central office. A filter in the form of a capacitor 64 is also utilized to stop unwanted voltages and voltage spikes from being transmitted to the central office.

General Schematic and Block Configuration

Figure 4:
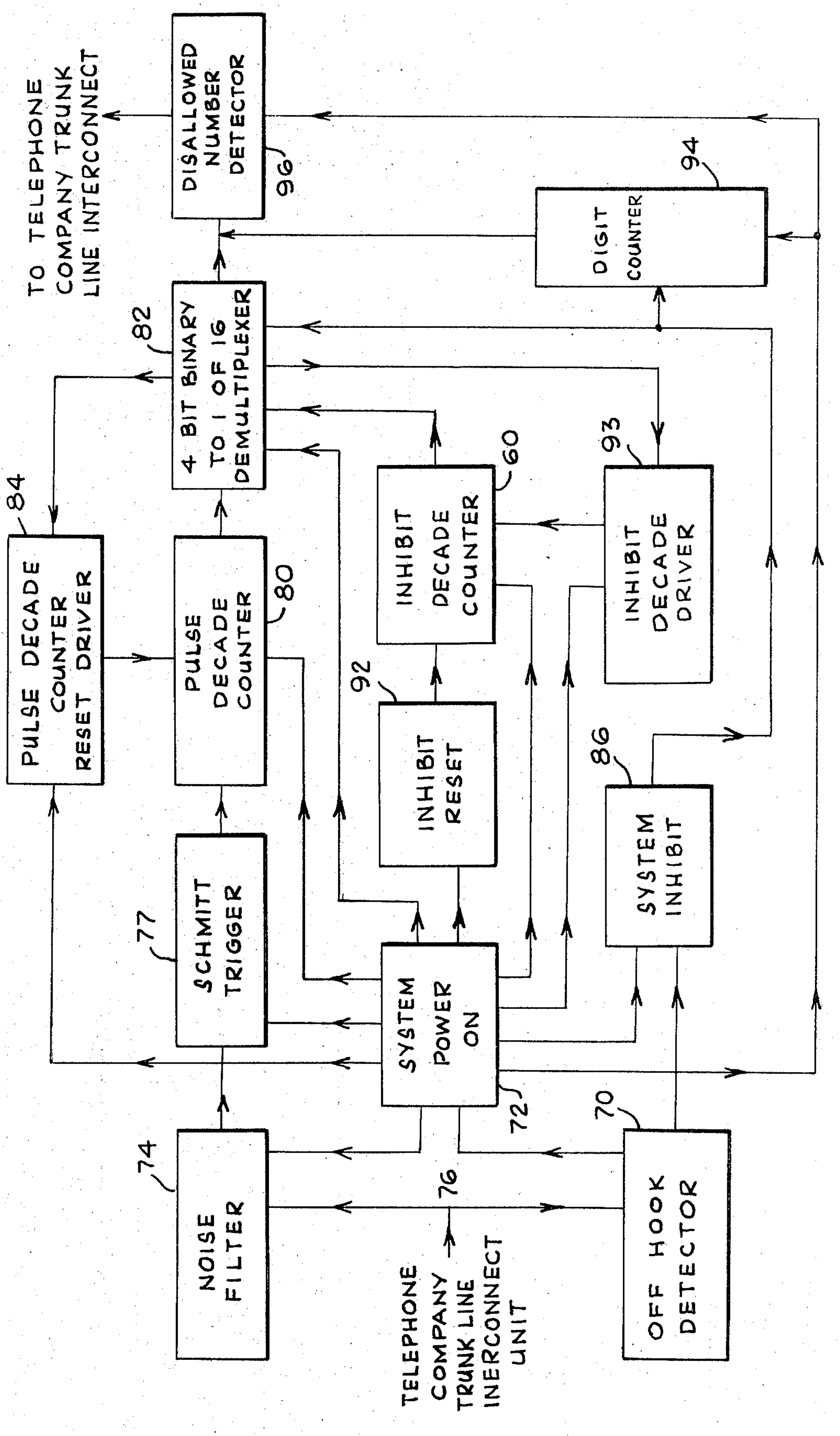
FIG. 4 shows a flow diagram and general schematic block diagram of this invention; and, FIG. 5 shows a detailed schematic of the circuitry of this invention.

Looking more particularly at FIG. 4, a connection 76 for a telephone company interconnect is generally shown. The interconnect provides dial pulses similar to that shown in FIG. 3. The interconnect unit is of course connected to the modular unit 10 in the manner shown in FIG. 3. In addition thereto, the modular unit 10 generally shown in schematic form in FIG. 4 can be connected to any other source of dial pulses other than the interconnect unit. The main criteria is that the connection provide dial pulses or signals from the operation of the dial causing a make and break.

The modular unit 10 is firstly actuated by means of an off-hook detector 70. The off-hook detector 70 determines when the hook switch of a telephone instrument has been closed by virtue of the receiver being displaced therefrom. The off-hook detector allows the system power source 72 to effectuate power to the entire system.

A noise filter 74 is utilized in cooperation with a Schmitt trigger 77. The noise filter 74 serves to eliminate highs and lows of the pulses being delivered to the interconnect 76. The Schmitt trigger squares the wave pulses which have been appropriately filtered by the noise filter 74 for more effective operation of the circuit.

The system power 72 also provides power to the remaining portion of the circuit. A pulse decade counter 80 is utilized to count the pulses and issue a binary signal to a binary demultiplexer 82. Upon completion of the demultiplexing, the pulse decade counter 80 is reset by a pulse decade counter reset driver 84.

An entire system inhibitory function is provided by a system inhibit 86 which inhibits an output to prevent false actuation by false signals or fluctuation in the system. An inhibit decade counter 90 is provided with an inhibit reset function 92 to reset the decade counter in an appropriate manner as will be described. In addition to the foregoing block systems, an inhibit decade drive 93 is utilized to drive the inhibit decade counter in response to the demultiplexer 82.

In order to check the count of the pulses against the dial pulls, a digit counter 94 is utilized to count the number of dial pulls. If the dial pulls are in excess of seven (thus indicating a toll call) this will cause a disallowed number detector 96 to function if it did not function in response to the pre-established programmed number of pulse counts. In other words, the digit counter 96 serves as a backup to the pulse counter 80 so that if it did function in whole or in part, the digit counter will serve to monitor prospective toll calls. In other words, the disallowed number detector 96 will open its contacts for curtailing a non-authorized call in response to either actuation by the binary demultiplexer 82 after it has received a specific number of pulses from decade counter 80 or in response to the digit counter 94 after it has received a specific number of dial pulls.

The foregoing action by the disallowed number detector causes the central office connection to be broken so that the telephone instrument cannot be used to make a toll call. In addition thereto, the disallowed number detector can be provided with a particular tone generator in order to effectuate a warning to the individual making an unauthorized call that such a call has been attempted.

Detailed Description of the Circuit

Figure 5:
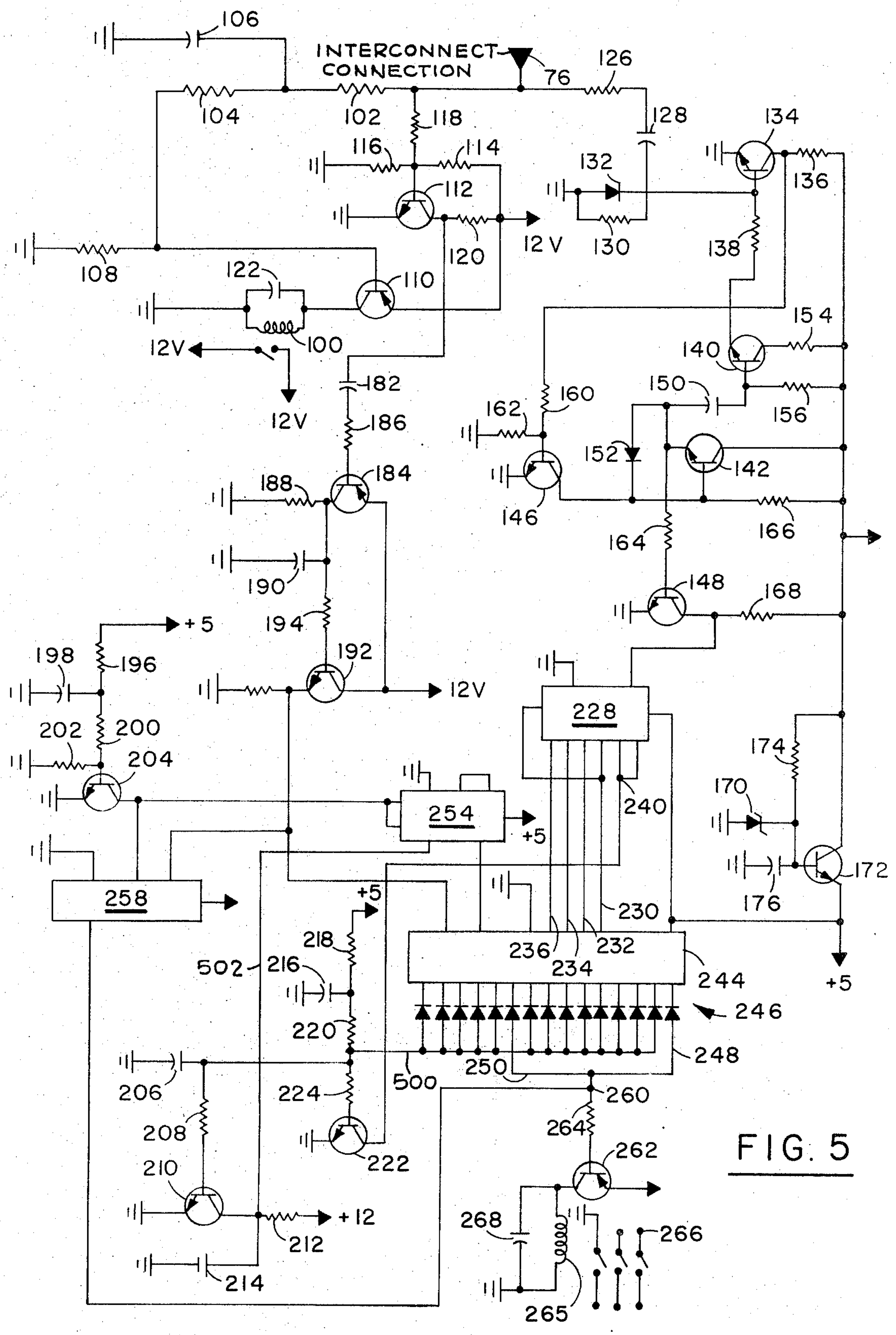

Looking more specifically at the schematic diagram shown in FIG. 5, a showing is made of the modular unit 10. The modular unit 10 is connected at the telephone company interconnection point 76. When the connection point 76 receives a signal by virtue of the hook switch being closed, it causes a signal to close a relay 100. The relay 100 is provided with circuitry to cause its closure without disturbing the remainder of the circuit of the modular unit 10. Specifically, a voltage divider in the form of resistors 102 and 104 are connected to the interconnect point 76 with a capacitor 106 thereacross. The capacitor 106 is used for filtering out unwanted signals from the telephone instrument.

A further portion of the voltage divider is provided by a resistor 108 which is utilized to maintain a transistor 110 at a suitable level. Transistor 110 is a pnp transistor which causes the relay to function when its base goes low. Specifically, transistor 110 turns on when the telephone instrument hook switch is closed. A positive voltage to operate the relay 100 is thereby provided when the transistor turns on. A capacitor 122 is utilized to filter any unwarranted spikes in the system to prevent the relay 100 from opening and closing.

When the relay 100 closes, it energizes the system with a 12 volt supply. The 12 volt supply is connected to various other portions of the circuit except the integrated circuits which form a part of the circuit logic. The latter are supplied with a 5 volt power supply from a voltage regulator which will be described.

When the pulses are received by virtue of the off-hook detector 70, actuating the modular unit 10 and supplying power, the pulses are conducted through the noise filter 74. The noise filter 74 comprises a first resistor 126 and a capacitor 128 which serve to isolate the pulses. A second resistor 130 and a diode 132 serve to clip off the unwanted negative portions of the signal.

A transistor 134 is utilized with biasing resistors 136 and 138 for purposes of saturating on the positive side of the signal at a particular level. This serves to eliminate unwanted positive voltage peaks.

Transistors 140, 142, 146 and 148 comprise a form of Schmitt trigger along with capacitor 150 and diode 152 with appropriate resistances 154, 156, 160, 162, 164, 166 and 168. The Schmitt trigger, utilizing the foregoing circuit configuration, squares the waves in a substantially square form in order to effectuate proper responses from the circuit and maintain a high degree of operability.

A voltage regulator having a zener diode 170, a transistor 172, and resistor 174 and a capacitor 176 is utilized to provide a positive 5 volts to the integrated circuits as will be described. The zener diode of course provides a reference voltage and the capacitor 176 is utilized as a filter.

An amplifier 112 is shown in the form of a transistor 112 which serves to amplify the signal when the receiver is taken off the hook. The transistor 112 is biased at its base across a voltage divider comprising resistances 114 and 116, and is provided with a current limiting resistor 118. The transistor 112 has its collector biased by resistor 120.

The modular unit 10 system inhibit circuit 86 is provided with the transistor 112 which has its collector connected to capacitor 182 which serves to couple the pulses from the telephone instrument to transistor 184 through a current isolation resistor 186. Transistor 184 is biased by a resistor 188 and conducts when pulses are received at its base. Capacitor 190 is utilized to cause a transistor 192 to conduct in the following manner.

The pulses from the telephone instrument are fed to transistor 112 and coupled by capacitor 182 and resistance 186 to the remainder of the circuit. The resistor 186 is utilized to reduce the signal to provide a high impedance input. Inasmuch as transistor 184 is a pnp transistor, it requires negative pulses to turn it on. Transistor 184 transmits the pulses through its collector to put a positive charge on capacitor 190.

The charge on capacitor 190 is maintained by virtue of the fact that resistances 188 and 194 are of a substantial value and there is not significant leakage from the capacitor 190. Thus, a charge is maintained on capacitor 190 as long as the dial pulses are coming into the base of transistor 184 which is coupled to transistor 192. The positive charge on capacitor 190 allows a positive signal to turn on transistor 192 thus putting a positive signal on the circuits connected to its emitter in cooperation with resistor 193.

The positive potential provided at the emitter of transistor 192 is seen on inhibit line 201 which is connected to demultiplexer 244. This positive going signal inhibits any output from the demultiplexer 244 during the counting of the pulses so that the pulse decade counter 228 can effectively count the pulses and relay them to the demultiplexer.

The foregoing components and functions are the circuit which can be referred to as the system inhibit 86 on the schematic diagram.

An adjunct to the system inhibit 86 is found in an inhibit reset portion 92 comprising a resistor 196 and a filter 198 which serves as a circuit delay filter. Resistors 200 and 202 are used to bias transistor 204 which serves to reset the counters 254 and 258 connected thereto which will be described.

An inhibit decade drive 93 comprising capacitor 206, resistor 208, and transistor 210 is used to inhibit the demultiplexer 244 upon a second dial pull. Transistor 210 is provided with a biasing resistor 212. A capacitor 214 is coupled to the collector of transistor 210, and serves to filter the unwanted voltages.

An inhibit function is provided to the demultiplexer 244 after the dial has been pulled a second time, or it can be programmed for any particular number of dial pulls. It specifically operates in the following manner. If the first pulse is not a prohibited number, it will be received as an output on line 500 which is connected to the base of transistor 210. Transistor 210 will then conduct so that a positive going signal is seen on line 502 which is connected to the decade counter 254.

Transistor 210 conducts when a negative going signal is received at its base. Specifically, transistor 210 receives a negative going pulse on line 500 from the demultiplexer so that transistor 210 will turn off thereby providing a positive going voltage on line 502 which then advances the counter 254 one step. The same thing happens for a pulse on the second dial pull if it is not a disallowed number.

The foregoing causes the counter 254 to advance another step thereby putting a positive voltage on line 203 which is an inhibit line and prevents the demultiplexer 244 from having any further output. It should be understood that the counter 254 can be programmed to allow 2, 3, 4, 5 digit pulls in the eventuality a telephone system has such sequences for toll calls.

A pulse decade counter reset driver 84 is utilized for resetting the pulse decade counter 80. This circuit comprises a capacitor 216 across a voltage divider 218 and 220, and is coupled to a transistor 222. Transistor 222 is connected to a resistor 224 at its base which forms a voltage divider with resistances 220 and 224 and serves to isolate the base of transistor 222. In effect, when the multiplexer line 500 goes to ground, or negative, the transistor 222 turns off, allowing point 240 to go positive, thus resetting decade counter 228.

A major function of the modular unit 10 is performed by a pulse decade counter 228 which has four binary outputs 230, 232, 234 and 236. The pulse decade counter 228 is connected to the reset driver at point 240.

A four bit binary demultiplexer 244 serves to demultiplex outputs of the pulse decade counter 80 i.e. 228. The four bit demultiplexer 244 is coupled to an array of diodes 246 which serve to maintain the operation of the four bit demultiplexer 244 for purposes of stopping unauthorized calls.

In order to cause the circuit to function properly, an inhibit function is provided by an integrated circuit designated 254 which inhibits the demultiplexer after the second number. Of course, this can be programmed in any manner, depending upon what number should be prohibited.

In the particular configuration shown, the modular unit 10 is programmed by changing the outputs from diodes 246 starting with output 248 within the array of 16 outputs. In the showing of the figures, output 250 is provided as an output analogous to zero and output 248 is analogous to 1. The remaining outputs are analogous to the numerals 2 through 9. In this manner, the modular unit is programmed for prohibiting unauthorized calls which originate with a 1 or a zero. Of course, the remaining outputs between 248 and 250, which represent numbers from 2 through 9 can be similarly programmed. However, the outputs 2 through 9 are placed on line 500 which resets the pulse decade counter 228 and advances the inhibit decade counter 254. In this manner, the pre-programming can inhibit calls related to any given set of numbers from 0 through 9.

In order to cause the system to check itself or operate effectively when the pulse counting portion of the modular unit is not functioning, a digit counter 258 is provided. The digit counter 258 is a one of 10 output counter and is programmed so that after seven digits have been dialed, regardless of the number of pulses, the entire system will operate to prohibit an unauthorized call. Of course, when the modular portion of the system which counts pulses is not operating properly and the digit counter must be relied upon, the prohibition of unauthorized calls takes a longer time. In other words, the system must wait until eight numbers are dialed before it prevents any unauthorized calls.

When the unauthorized calls are recognized by either the number of pulses or the digits being counted, an output is placed on line 260. The output effectively goes to an amplifying transistor 262 provided with a current limiting resistor 264 to limit base currents to the transistor. The transistor 262 serves to operate a relay coil 265 across the telephone circuit so that a call will be prohibited by opening up the contacts 266 for the respective tip, ring and ground lines. A capacitor 268 is provided to prevent counter emf from coil 265 from closing the relay contacts 266. Thus, the contacts 266 remain open for a period of time to allow the entire telephone network to function. After this, the relay contacts 266 will then close, allowing the circuit to stand by for recognition of any other unauthorized calls.

It should be recognized that other discrete circuits can be utilized for effectuating the teachings of this invention to provide analogous means for opening the telephone lines. Thus, this invention is only to be read as to the scope and spirit thereof in light of the following claims.

What is claimed is:

1. A combination of a telephone interconnecting means and a toll prohibiting module comprising:
- a telephone interconnect for providing pulses from said telephone;
- means for connecting said interconnect between said telephone and a central office trunk line;
- connection means between said interconnect and said toll prohibiting module;
- a relay within the circuit of said toll prohibiting module;
- detection means within said toll prohibiting module for determining when the telephone receiver is off the telephone instrument, connected within said module to activate the toll prohibiting function;
- means for providing power to said toll prohibiting module;
- means connected within said module to said connection means for counting the total of the respective numbers being dialed on the telephone;
- a separate means also connected within said module to said connection means from said total number counting means for counting the number of pulses from said telephone instrument which are being generated by the telephone in order to provide an indication of a discrete number being dialed; and,
- means to operate said relay to open a connection between said telephone instrument and said central office trunk in response to either a discrete number or a total of numbers from the telephone.

2. The combination as claimed in claim 1 further comprising:

a relay within said interconnect capable of opening the tip ring and ground connections to the central office.

3. The combination as claimed in claim 2 further comprising:

a noise filter for eliminating unwanted signals emanating from said telephone instrument.

4. The combination as claimed in claim 1 wherein said pulse counting means comprise:

a pulse decade counter; and, means for converting a binary output of said pulse decade counter into a demultiplexed signal.

5. The combination as claimed in claim 4 further comprising:

a power supply capable of delivering five volts to the integrated circuits utilized with the combination.

6. A combination for prohibiting a particular call from a telephone instrument comprising:

a hook switch circuit for determining when the receiver of a telephone instrument has been removed from its hook;

means connected to said hook switch circuit and to a telephone instrument for detecting pulses emanating from a telephone in response to the turn of its dial corresponding to a specific number thereof;

a second means connected to said first means for counting the number of dial pulls; and, a third means connected to said first and second means responding to the foregoing number of pulses or the number of dial pulls to disconnect the telephone instrument from the central office trunk line upon a pre-established number of pulses or a pre-established number of turns of the dial.

7. The combination as claimed in claim 6 further comprising:

a noise filter having a diode and a transistor to chop the high and low ends of a pulse from the output of the filter.

* * * * *